United States Patent [19]
Perkins et al.

[11] Patent Number: 5,680,423
[45] Date of Patent: Oct. 21, 1997

[54] METHOD AND APPARATUS FOR DETECTING NEUTRONS

[75] Inventors: Richard W. Perkins; Paul L. Reeder; Ned A. Wogman, all of Richland; Ray A. Warner, Benton City; Daniel W. Brite; Wayne C. Richey, both of Richland, all of Wash.; Don S. Goldman, Orangevale, Calif.

[73] Assignee: Battelle Memorial Institute, Richland, Wash.

[21] Appl. No.: 410,169

[22] Filed: Mar. 24, 1995

[51] Int. Cl.$^6$ .................................................. G01T 3/06
[52] U.S. Cl. ........................... 376/153; 376/248; 376/255; 250/390.11
[58] Field of Search ................................ 250/361 R, 362, 250/366–369, 389, 390.11; 376/248, 255.2, 258, 259, 153, 155

[56] References Cited

U.S. PATENT DOCUMENTS

| | | | |
|---|---|---|---|
| 4,795,910 | 1/1989 | Henderson et al. | 250/368 X |
| 4,931,646 | 6/1990 | Koechner | 250/367 |
| 5,231,290 | 7/1993 | Czirr et al. | 250/390.11 |
| 5,264,702 | 11/1993 | Mihalczo | 250/390.11 |
| 5,289,510 | 2/1994 | Mihalczo | 376/258 |
| 5,323,011 | 6/1994 | Suter et al. | 250/368 X |

OTHER PUBLICATIONS

*The physics and structure–property relationships of scintillator materials: effect of thermal history and chemistry on the light output of scintillating glasses,* Nuclear Instruments & Methods in Physics Research, Section A 342 (1994) 357–363.

*Method for measuring the light output of scintillating glass shards,* Nuclear Instruments & Methods in Physics Research, Section A 345 (1994) 95–98.

*Hand–held scintillating fiber–optic neutron detector,* M. Bliss and R.A. Warner; Arms Control and Nonproliferation Technologies, Third/Fourth Quarters 1993.

Primary Examiner—Michael J. Carone
Assistant Examiner—Matthew J. Lattig
Attorney, Agent, or Firm—Douglas E. McKinley, Jr.

[57] ABSTRACT

The instant invention is a method for making and using an apparatus for detecting neutrons. Scintillating optical fibers are fabricated by melting $SiO_2$ with a thermal neutron capturing substance and a scintillating material in a reducing atmosphere. The melt is then drawn into fibers in an anoxic atmosphere. The fibers may then be coated and used directly in a neutron detection apparatus, or assembled into a geometrical array in a second, hydrogen-rich, scintillating material such as a polymer. Photons generated by interaction with thermal neutrons are trapped within the coated fibers and are directed to photoelectric converters. A measurable electronic signal is generated for each thermal neutron interaction within the fiber. These electronic signals are then manipulated, stored, and interpreted by normal methods to infer the quality and quantity of incident radiation. When the fibers are arranged in an array within a second scintillating material, photons generated by kinetic neutrons interacting with the second scintillating material and photons generated by thermal neutron capture within the fiber can both be directed to photoelectric converters. These electronic signals are then manipulated, stored, and interpreted by normal methods to infer the quality and quantity of incident radiation.

10 Claims, 2 Drawing Sheets

METHOD AND APPARATUS FOR DETECTING NEUTRONS

This invention was made with Government support under Contract DE-AC06-76RLO 1830, awarded by the U.S. Department of Energy. The Government has certain rights in the invention.

FIELD OF THE INVENTION

The present invention relates generally to a method for drawing optical fibers enriched with a first substance having a high probability of capturing thermal neutrons and a first scintillating material, and the use of said optical fibers for the detection of neutrons.

BACKGROUND OF THE INVENTION

An ability to quantitatively and qualitatively measure radiation has broad and diverse applications. For example, in research settings, a sensitive apparatus for measuring radiation allows more careful experimentation and better interpretation of data. In medical settings, it is critical during radiation therapy that the doctor have the ability to accurately measure both the location and the dose of radiation administered to a patient. In geological studies, apparatus which measure either naturally occurring radiation or radioactive sources placed within the environment are critical for the accurate interpretation of subsurface formations. The production and safety of nuclear power are enhanced by the accurate measurement of radiation in nuclear reactions, cooling, and power production systems. Also, the ability to measure radiation is advantageous for security related to the non-proliferation of nuclear weapons.

Existing neutron detectors suffer from a variety of drawbacks which limit their application in certain environments. They may be large, bulky, have an inflexible detection means, or be unable to distinguish some forms of ionizing radiation from neutrons. Examples of detectors known in the art include counters or ionization chambers filled with boron-containing gases in which neutrons are detected by the production of ionizing alpha particles when neutrons react with boron-10. More versatile detectors have utilized coated glass fibers which are made to scintillate through the absorption of energy in the coatings upon interaction with neutrons, or glass plates enriched with materials which scintillate upon interaction with neutrons. Two devices utilizing such schemes are described in U.S. Pat. No. 5,231, 290, entitled "Neutron Coincidence Detectors Employing Heterogeneous Materials" (the '290 patent) and U.S. Pat. No. 5,264,702, entitled "On-Line Tritium Production Monitor" (the '702 patent). The '290 patent discloses a neutron reactive, scintillating material placed adjacent to glass plates enriched with lithium-6. The '702 patent discloses glass fibers coated with lithium-6 wherein energy deposited within the lithium-6 by neutrons causes the fiber to scintillate, thereby transmitting the resultant light along the glass fiber. The present invention produces a fiber which overcomes the limitations inherent in both of these schemes.

As discussed in the '702 patent, glass fibers enriched with lithium-6 are known in the art. However, as also disclosed in the '702 patent, practitioners skilled in the art consider the use of glass fibers enriched with lithium-6 for the detection of neutrons impractical because the lithium-6 present in the glass causes considerable deterioration of the light transmitting characteristics of the glass so as to limit the maximum length of light transmission. The present invention specifically overcomes this long standing limitation of the prior art and provides scintillating glass fibers enriched with a substance which has a high probability of capturing thermal neutrons, such as lithium-6, and which transmits light within the fibers for distances over 2 meters. This has been possible because the present invention has demonstrated that the short transmission lengths were due to the presence of Ce in a +4 oxidation state and other impurities within the glass rather than the presence of lithium-6 as indicated by the '702 patent.

The invention utilizes a reducing atmosphere to melt $SiO_2$, with a thermal neutron capturing substance and a first scintillating material. Lithium-6 is preferred as a thermal neutron capturing substance, and Ce in a +3 oxidation state is preferred as a first scintillating material. The melt is then drawn into fibers in an anoxic atmosphere. The process results in fibers which scintillate upon interaction with thermal neutrons and transmit light created by those scintillations over far greater distances than had been available in the past. The use of these fibers for neutron detection provides inherent advantages over the prior art. For example, in the '290 patent, glass plates enriched with lithium-6 are used as the scintillation and light transmission means. The use of fibers instead of plates allows flexibility in the detection means, which in turn allows the apparatus to be easily conformed to a variety of configurations as may be required by different operating environments. The present invention possesses the further advantage that a plurality of fibers may be arranged in an array within a second scintillating material such as a polymer. When a kinetic neutron collides with the hydrogen atoms in a polymer, a scintillation occurs and the kinetic neutron is slowed and transformed into a thermal neutron by the collision. The thermal neutron produced by this collision will be adsorbed by lithium-6 if the thermal neutron and the lithium-6 come into contact. However, once the collision with the polymer occurs, the direction the thermal neutron will travel is unpredictable. Thus, the arrangements disclosed in the prior art suffer because there exists a higher probability that the thermal neutron will not travel from the polymer to the lithium-6 enriched glass. Instead, there exists the possibility that the thermal neutron will travel parallel to the plate and simply remain in the polymer and will not interact with the lithium-6 and generate a second scintillation. The use of lithium-6 enriched fibers in an array greatly increases the number of possible angles the thermal neutron may travel which will cause the neutron to come into contact with the lithium-6. Thus, positioning the fibers in an array increases the likelihood of each neutron generating a signal upon interaction with a fiber and thus provides an accurate count of the total number of interactions.

Other and further objects of the present invention will become obvious upon an understanding of the illustrative embodiments about to be described or will be indicated in the appended claims, and various advantages not referred to herein will occur to one skilled in the art upon employment of the invention in practice.

SUMMARY OF THE INVENTION

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

The instant invention is a method for making and using an apparatus for detecting neutrons. Scintillating optical fibers are fabricated by melting $SiO_2$, with a thermal neutron capturing substance and a first scintillating material. Lithium-6 is preferred as a thermal neutron capturing substance, and Ce in a +3 oxidation state is preferred as a first scintillating material. The melt is then drawn into fibers in an anoxic atmosphere. The fibers may then be coated or assembled into a geometrical array in a second material such as a polymer. When a kinetic neutron collides with a hydrogen atom in a coating such as a polymer, the polymer scintillates and the neutron is slowed and transformed into a thermal neutron. Thermal neutrons may then interact with the optical fibers by physical absorption of the thermal neutron by lithium-6, which in turn produces an alpha particle and a triton. The triton may then collide with the Ce in a +3 oxidation state which produces a second scintillation. A fraction of the photons produced by this second scintillation are trapped within the fiber due to differences in the refractive index of the fiber and the surrounding material. Photons trapped within the fiber and photons trapped within the scintillating material are directed to photoelectric converters, such as photomultiplier tubes or avalanche photodiodes, such that a measurable electronic signal is generated for each thermal neutron interaction within the fiber. These electronic signals can then be manipulated, stored, and interpreted by normal methods to infer the quality and quantity of incident radiation.

DESCRIPTION OF THE PREFERRED EMBODIMENTS

Figures 1, 2:
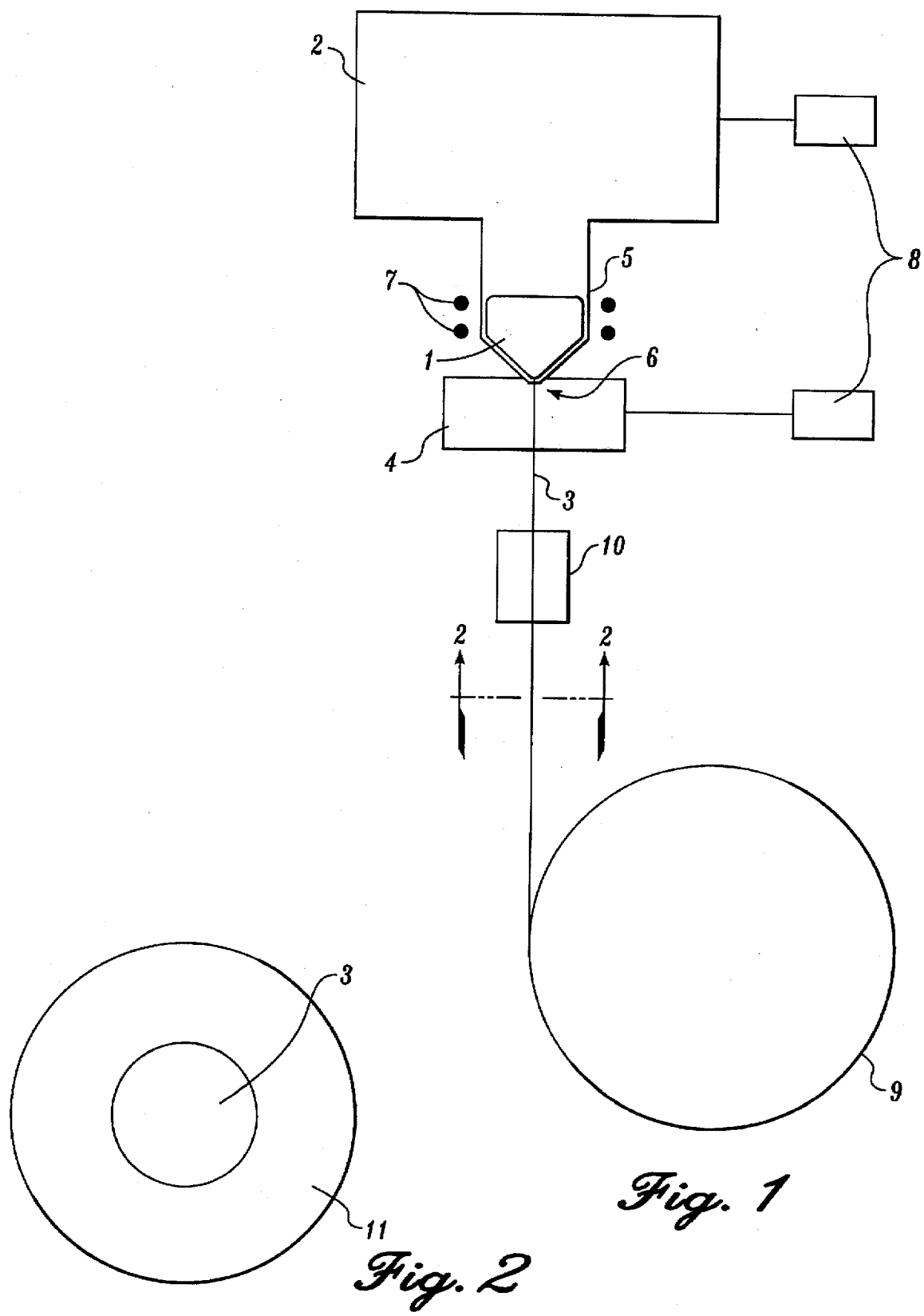
FIG. 1 is a schematic drawing which illustrates the process of the present invention.
FIG. 2 is a cross section of a fiber coated with a second scintillating material taken along line 2—2 of FIG. 1.

The instant invention is a method for making and using an apparatus for the detection of neutrons. More specifically, as illustrated in FIG. 1, scintillating optical fibers are fabricated by heating and mixing silicon containing compounds, including but not limited to $SiO_2$, with a thermal neutron capturing substance and a first scintillating material to form a molten mixture (1). The melt is performed in a reducing atmosphere which may be contained in a first chamber (2) or by any known or convenient means. The reducing atmosphere can be any suitable gas including, but not limited to, a buffered $CO/CO_2$ mixture. Any conventional heating means may be used. FIG. 1 illustrates a first chamber (2) utilized for containing a reducing atmosphere opening to a second chamber (5) which is surrounded by an induction furnace (7). Materials are simultaneously held in a reducing atmosphere provided by the first chamber while the materials are melted in the second chamber by means of the induction furnace.

Lithium-6, due to its high cross section for neutron capture and its characteristic of producing alpha and triton products upon neutron capture, is preferred as a thermal neutron capturing substance; however, other neutron capturing substances including boron-10, gadolinium, samarium, europium and hafnium could also be used. Cerium in a +3 valence state is preferred as a first scintillating material because it has the greatest efficiency for converting ionization energy, including triton interactions, into scintillation light. To insure that Cerium is in a +3 valence state, it may be introduced to the batch in a form such as cerium acetate. Other rare earth ions will scintillate upon interaction with ionizing radiation (such as tritons), however, they tend to exhibit undesirable characteristics including lowered light output, interference with light transmission, and light emission spread over greater time periods as opposed to the fast emission of light as a pulse as is characteristic with Ce +3. It is the desire to maintain Ce in a +3 valence state which makes it critical to the invention that the melt take place in a reducing atmosphere and the fiber (3) be drawn to an anoxic atmosphere which may be contained by a third chamber (4) or any known or convenient means.

In oxidizing atmospheres, such as air, the Ce +3 will demonstrate a strong preference for oxidation to the +4 valence state, which severely deteriorates the operation of the glass scintillator because Ce +4 will capture light produced by scintillations and thus inhibit propagation along the fiber. In practice, the inventors have found a two step process convenient whereby the glass (1) is initially melted with the required constituents in a reducing atmosphere (not shown), the resulting product is then rapidly cooled to prevent phase separation or crystallization, then the solidified glass is transferred to be re-melted, again in a reducing atmosphere, where it is then drawn into fiber (3). Although this additional step may enhance the convenience of the process because it allows the initial melt of the glass to be performed apart from the fiber drawing apparatus, it is not necessary to practice the invention. The glass (1) is melted at approximately 1400 C. for 2 hours to complete melting and to achieve homogeneity. Whether in a single step process or a two step process, the glass (1) should be cooled rapidly to prevent phase separation or crystallization. Some phase separated glasses will produce satisfactory fibers; however chances for success are reduced. Crystallization of the melted glass can produce crystals which cannot be redissolved into the glass (1) before fiberizing; thereby, increasing light scattering within the fiber (3).

The second chamber (5) serves as a barrier and the glass (1) is drawn through an aperture (6) in the second chamber (5) into fiber (3) in an anoxic atmosphere, preferably helium. The second chamber (5) may be any non-reactive material. In practice, it has been shown to be convenient to utilize a platinum second chamber (5) shaped as a crucible suitable for holding the molten glass (1). In addition to being non-reactive with the molten glass (1), a platinum second chamber (5) will withstand the required temperature. Also, the inventors have found it convenient to apply heat to the glass (1) directly by heating the platinum second chamber (5). Heating may be achieved through the use of an induction furnace (7) or by other known means.

An anoxic atmosphere of helium in the region where the fibers (3) are drawn is preferred for three reasons. First, helium provides an anoxic atmosphere which prevents oxidation of Cerium +3 to Cerium +4 as described above; second, as is well known in the art, it is desirable to rapidly cool the fiber (3) as it is drawn to maintain a consistent diameter and geometry, and as discussed above, to prevent phase separation and crystallization. Helium is effective in rapidly cooling the fiber (3) as it is drawn. Third, helium provides dielectric protection to the platinum second chamber (5).

The diameter of the resultant fiber (3) is controlled by varying the diameter of the aperture (6), the speed at which the fiber is mechanically drawn by well known means such as a take-up drum (9), and controlling the relative pressures of the reducing atmosphere surrounding the glass (1) and the anoxic atmosphere into which the fiber (3) is drawn with pressure control means (8) known in the art. Optimal diameters are determined by nuclear considerations, such as the range of the products from a reaction of lithium-6 with neutrons, and range from 10 microns to 150 microns.

Figure 3:
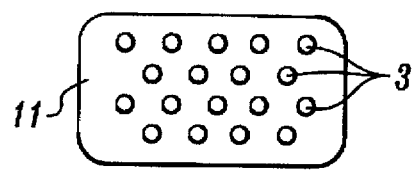
FIG. 3 is a cross section of a plurality of fibers held in a geometrical array with a second scintillating material.

The resultant fibers thus contain a first material having a high probability of capturing thermal neutrons and a first scintillating material. As illustrated by FIG. 2 the resultant fibers may then be coated with a coating means (10) with a second material (11). The resultant fibers in the configuration illustrated by FIG. 2 may then be utilized in the apparatus illustrated by FIG. 4 for the detection of neutrons. As illustrated by FIG. 3, a plurality of the resultant fibers may be imbedded in a second material (11). The resultant fibers in the configuration illustrated by FIG. 3 may then be utilized in the apparatus illustrated by FIG. 5 for the detection of neutrons. These apparatus my be used in environments including medical settings where radiation is administered to a patient, geological studies, measuring either naturally occurring radiation or radioactive sources placed within the environment, nuclear power plants, and security check points related to the non-proliferation of nuclear weapons.

First Embodiment

Figure 4:
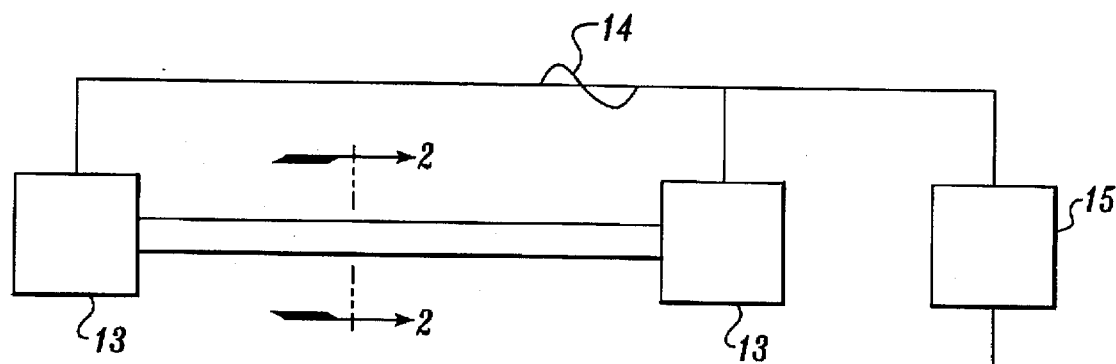
FIG. 4 is a schematic drawing which illustrates the configuration of the first embodiment of the present invention as utilized for neutron detection.
Figure 5:
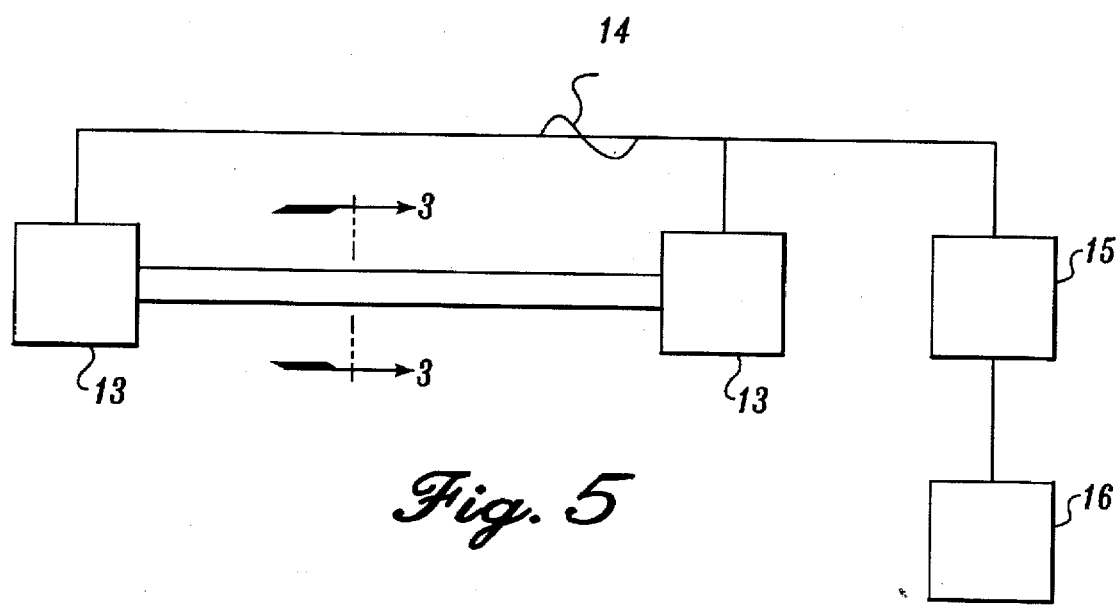
FIG. 5 is a schematic drawing which illustrates the configuration of the second embodiment of the present invention as utilized for neutron detection.

To utilize the resultant fibers (3) as neutron detectors, a fiber (3) may be coated by known means (10) with a second material (11) having a refractive index suitable for containing light produced by scintillation within the fiber (3) and thus insuring that light produced within the fiber (3) is propagated along the length of the fiber. FIG. 2 is a cross section of a coated fiber. The coated fiber is arranged in an apparatus as indicated in FIG. 4. Photons generated by interaction with thermal neutrons are trapped within the fiber (3) and are directed to photoelectric converters (13). A measurable electronic signal (14) is generated for each thermal neutron interaction within the fiber (3). These electronic signals (14) are then manipulated, stored, and interpreted by normal methods to infer the quality and quantity of incident radiation.

Second Embodiment

A plurality of fibers (3) may be held together and imbedded within a second material (11). FIG. 3 is a cross section of fibers held in an array with a second material. The fibers imbedded in a second material may be arranged in an apparatus as for detecting neutrons as illustrated in FIG. 4. In the second embodiment, the use of a hydrogen-rich scintillating material which is capable of propagating light, such as a polymer, is preferred as the second material (11) for three reasons. First, a polymer provides an acceptable refractive index for maintaining light produced by scintillations within a fiber (3). Second, a polymer with an optical quality which allows propagation of light emitted upon scintillation will allow the light from that scintillation to be directed along the length of the polymer. Third, the use of a polymer as the second material (11) is preferred because there is a high probability that a kinetic neutron which collides with the polymer will collide with a hydrogen atom in the polymer.

As contemplated by the second embodiment, the fibers (3) are imbedded in a second material (11) which is a separate scintillating material. When a kinetic neutron collides with a hydrogen atom in the second material (11), a scintillation occurs and the kinetic neutron is thermalized. Light generated by the scintillation is propagated along the second material (11) where it may be made to fall incident on a photoelectric converter (13), such that a measurable electronic signal (14) is generated for each kinetic neutron interaction within the second material (11).

Once thermalized, the neutron will travel in a direction which is unpredictable. As illustrated in FIG. 3, holding a plurality of fibers (3) in an array within the second material (11) greatly increases the probability that the thermalized neutron will interact with a fiber (3). This is because once a neutron has been thermalized in the second material (11), having a plurality of fibers (3) in an array maximizes the number of possible directions which the thermalized neutron may travel which will cause it to collide with a fiber (3). When thermal neutrons collide with a fiber (3), they are then absorbed by the lithium-6, which in turn ejects an alpha particle and a triton. The triton then collides with the Ce in a +3 oxidation state, also in the fiber, (3) which produces a second scintillation. Whether the fiber (3) is one of a plurality of fibers (3) held in an array, or a single coated fiber (3), a fraction of the photons produced by this second scintillation are trapped within the fiber (3) due to differences in the refractive index of the fiber (3) and the surrounding second material (11). As illustrated in FIG. 4, photons trapped within the fiber (3), and photons trapped within the second material (11), may be directed to a detection means such as photoelectric converters (13), such that a measurable electronic signal (14) is generated for each kinetic neutron interaction within the second material (11), and the corresponding thermal neutron interaction within the fiber (3). Thus, when the second material (11) is a scintillating material, two separate electrical signals (14) are generated by the presence of kinetic neutrons.

Each individual electrical signal (14) has characteristics associated with the phosphorescent decay time of either the fiber (3) or the second material (11). Suitable photoelectric converters (13) include, but are not limited to, photomultiplier tubes and avalanche diodes. Light falling incident upon the photoelectric converters is converted to electrical pulses (14) which are directed to a detection unit (15). These electronic signals (14) can then be manipulated, stored, and interpreted by normal methods to infer the quality and quantity of incident radiation.

Normal methods may be utilized within the detection unit (15) to analyze the electrical pulses (14). For example, by exposing the detectors to known forms of radiation, a library of known pulse patterns can be generated and stored in the detection unit (15) allowing comparison with electrical signals (14) generated by unknown radiation. In this manner, electrical signals (14) created by interaction with the neutrons of interest can be distinguished from pulses which may be created by other forms of ionizing radiation. Upon detection, normal methods may be utilized to provide indication either on site or remotely through an indications means (16).

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for drawing scintillating glass fibers, comprising the steps of:

(a) Heating a mixture of a thermal neutron capturing substance, $SiO_2$, and a scintillating material in a chamber in a reducing atmosphere to a molten glass, (b) drawing the molten glass through at least one aperture in said chamber into an anoxic atmosphere.

2. The method in claim 1 wherein said thermal neutron capturing substance is selected from the group consisting essentially of lithium-6, boron-10, gadolinium, samarium, europium, and hafnium.

3. The method in claim 1 wherein the scintillating material is cerium.

4. The method in claim 3 wherein the scintillating material is cerium+3.

5. The method described in claim 1 wherein the reducing atmosphere is a buffered $CO/CO_2$ mixture.

6. The method described in claim 1 wherein the anoxic atmosphere is helium.

7. The method described in claim 1 wherein the chamber is platinum.

8. The method described in claim 1 further providing a means for controlling the pressure of the reducing atmosphere.

9. The method described in claim 1 further providing a means for controlling the relative pressures of the reducing and anoxic atmosphere.

10. The fiber produced by the process described in claim 1.

* * * * *